United States Patent [19]

Pixley

[11] 4,216,809
[45] Aug. 12, 1980

[54] PNEUMATIC TIRE HAVING A RUN-FLAT INSERT STRUCTURE

[75] Inventor: James J. Pixley, Canton, Mich.

[73] Assignee: Uniroyal, Inc., New York, N.Y.

[21] Appl. No.: 833,108

[22] Filed: Sep. 14, 1977

[51] Int. Cl.² ............................................... B60C 17/00
[52] U.S. Cl. ............................. 152/158; 152/330 RF; 152/341
[58] Field of Search ............... 152/339, 340, 341, 342, 152/349, 155, 157-159, 161, 162, 165, 166

[56] References Cited

U.S. PATENT DOCUMENTS

| | | | |
|---|---|---|---|
| 2,729,618 | 1/1956 | Muller et al. | 260/75 |
| 3,160,191 | 12/1964 | Anderson | 152/341 |
| 3,225,811 | 12/1965 | Hawkes | 152/340 |
| 3,407,859 | 10/1968 | Johnson | 152/340 |
| 3,578,056 | 5/1971 | Wynbelt | 152/340 |
| 3,941,176 | 3/1976 | Schwartz | 152/340 |

FOREIGN PATENT DOCUMENTS

| | | | |
|---|---|---|---|
| 625562 | 8/1961 | Canada . | |
| 2422558 | 11/1975 | Fed. Rep. of Germany | 152/340 |
| 1163953 | 5/1958 | France | 152/340 |
| 658465 | 10/1951 | United Kingdom . | |

*Primary Examiner*—John J. Love
*Attorney, Agent, or Firm*—Jack Posin

[57] ABSTRACT

A run-flat insert structure for a pneumatic tire is disclosed in which the insert structure comprises a homogeneous elastomeric material and is fully enclosed and pneumatically inflated. The insert structure is mounted within the cavity formed by the pneumatic tire and the wheel rim upon which the tire is mounted. The insert structure is shaped and spaced from the interior walls of the tire such that contact between the insert structure and the interior tire walls is minimized during rated load carrying and inflation conditions of the tire. The volume of the insert structure is less than 50% of the volume of the cavity formed by the tire and the wheel rim to thereby assist in avoiding undesirable contact between the insert structure and the tire. During the deflated condition of the tire, the insert structure supports the tire and its load at a deflection that prevents excessively rapid deterioration of the tire while running in the deflated, run-flat condition.

2 Claims, 2 Drawing Figures

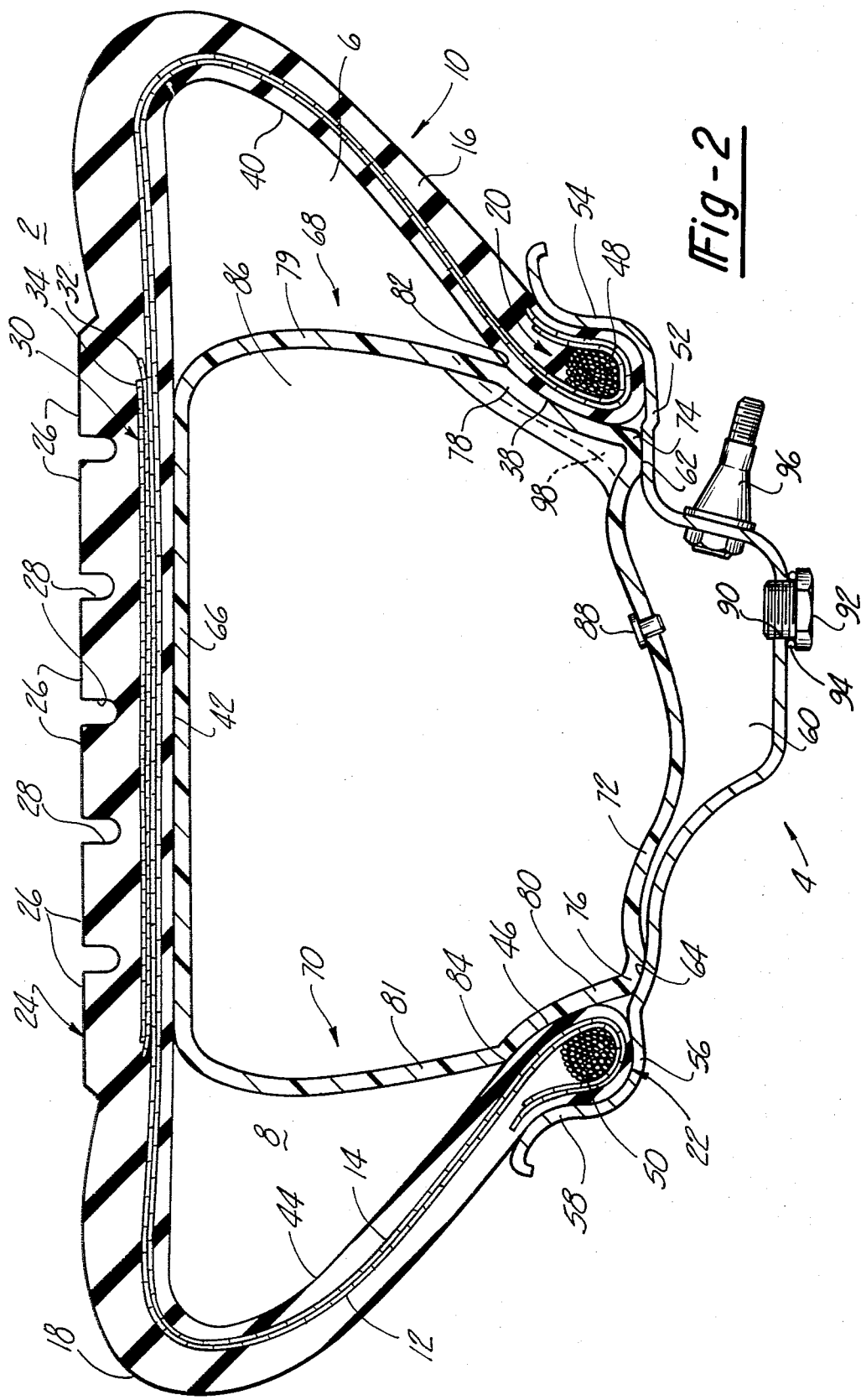

PNEUMATIC TIRE HAVING A RUN-FLAT INSERT STRUCTURE

BACKGROUND OF THE INVENTION

This invention relates to pneumatic tires and more particularly to a pneumatic insert structure positioned within the air chamber of a pneumatic tire for supporting load and maintaining the tire on its rim when the tire is deflated.

Present day pneumatic tires commonly utilize an inner tube to contain air or they are tubeless. In the latter type of tire, the beads of the tire are seated tightly against the wheel rim, and the wheel and the tire together form a sealed air containing chamber. Puncture of either a tubeless or tube type tire on a vehicle will result in the deflation of the tire to a "flat" condition and a number of consequent problems for the operator of the vehicle. If any attempt is made to run on the flat tire for more than a very short distance, the tire will rapidly deteriorate. Thus, the flat tire has to be replaced with another tire usually carried as a spare in passenger type vehicles. Considerable difficulty is often involved in replacing a flat tire with a spare tire. Many people do not have the strength and sometimes the know-how to remove a tire and replace it with another, spare tire. Also, removing a tire and putting a spare tire on a vehicle can be quite dangerous on busy highways and streets.

Another critical problem when tire deflation is rapid is the possible loss of control of the vehicle. The danger is caused by the loss of stability of the tire when it rapidly collapses and the tire beads are released to move off of their seats on the wheel rim.

A wide variety of tires and associated "run-flat" tire structures have been offered as solutions to these problems. These solutions include, (1) a multi-chambered tube in which a number of chambers will remain inflated if one is punctured and loses air, (2) an inner tube-like structure occupying less than all of the tire interior space that is not readily punctured due to its being remote from the tire tread area, (3) a diaphragm similar to a tube spaced from the tire tread, but which is not a completely enclosed chamber and has the ends of its sides sealed against the tire in the bead region and, (4) a solid structure mounted on the wheel, usually annular in shape, bearing against the tire bead and extending above the rim.

The multi-chambered inner tube has not been successful due to its complexity and resulting high cost and manufacturing difficulty. This type of tube also adds considerable bulk to the tire and increases its operating temperature. A solid run-flat support structure typically has at least one and frequently both of the problems of complexity and difficulty in mounting due to the problem of clearing the wheel rim. The pneumatic diaphragm has not been successful due to lack of reliability of the seal against the tire bead and the complexity and mounting difficulty incurred when attempting to assure the seal by means such as clamping the diaphragm ends between the rim and bead. Drawbacks of both the completely enclosed inner tube-like structure and the diaphragm, where they occupy less than all of the tire interior space, include excessive contact with the interior crown region of the tire, the bead region, and the radially inward sidewall region of the tire during normal inflated load carrying conditions which causes deterioration of both tire and the support structure. Also, prior pneumatic run-flat support structures frequently permit excessive deflection of the tire when it is deflated to cause its rapid deterioration. A further problem of pneumatic type run-flat structures is material fatigue which causes their rapid deterioration when the tire is deflated and the run-flat structure is carrying load. This problem is due in part to the difference in circumference between the tread of the tire and the run-flat structure. As the tire rotates through its tread patch (the portion of the tire in engagement with the road surface), the greater distance that the longer tread must travel relative to the run-flat structure causes buckling of the tire and scuffing, bumping movement relative to the wheel rim of the run-flat structure.

With respect to the prior art, the closest prior art of which the applicant is aware is U.S. Pat. No. 3,941,176, United Kingdom Pat. No. 658,465, and Canadian Pat. No. 625,562. Copies of each of these patents are enclosed with this patent application.

U.S. Pat. No. 3,941,176 is relevant in that it discloses a fully enclosed pneumatic chamber positioned within the air cavity of a tire. The inner chamber is made of a thermoplastic elastomer material and has a volume in excess of 50% of the volume of the tire cavity volume. In this construction, the distance between the crown region of the inner chamber and the tire surface radially inward of the tread is stated to be not critical. On the contrary, however, it is believed that this distance is critical due to the problem of engagement with and scuffing of the inner crown region of the tire by the inner chamber. Further, an inner chamber volume of 50% or more of tire cavity volume will result in considerable scuffing of the tire inner crown region, bead region and sidewall region by the inner chamber during normal inflation and load carrying conditions of the tire.

In United Kingdom Pat. No. 658,465, there is disclosed a safety tube which occupies at least 30% of the air space within the tire but not the entire space within the tire. The sidewall of the safety tube engages the bead region and the lower sidewall region of the tire. The problem with this type of run-flat tube construction is also that it will interfere with the sidewall action of the tire during normal inflation and load conditions and will permit excessive deflection and consequent deterioration of the tire when the latter is deflated and the safety tube is carrying the load.

In Canadian Pat. No. 625,562, there is disclosed a diaphragm which is anchored in place and sealed against the beads of the tire by wrapping the edges of the diaphragm around the bead and clamping them between the wheel rim and the bead when the tire is seated. The volume of the air in the compartment formed by the diaphragm and rim comprises 60% of the volume of the air in the space formed by the inner surface of the tire and the rim. The tire deflects not more than 25% of its height radially outward of the rim flanges when it is in a deflated condition. The sidewall of the diaphragm extends along the bead region and into the radially inward sidewall region of the tire. Thus, in this construction also, there will be interference with the functioning of the sidewall. Also, minimizing the deflated tire deflection is accomplished by utilizing a diaphragm compartment volume of 60% of the volume of the compartment formed by the tire and rim.

In the detailed description of the invention following hereinafter, the section height of the tire is used as a reference value for describing or measuring distances and the amount of deflection of the tire and insert structure. The term "section height" of the tire as used herein means the height of the section of a new tire, where the section is in a plane passing through the axis of the tire and through the tread patch of the tire, and the height is in a radial direction perpendicular to the axis of the tire between the most radially outward edge of the rim flange of the wheel on which the tire is mounted and the most radially outward part of the tread of the tire when the tire is inflated to its rated inflation pressure and supporting its rated load.

SUMMARY OF THE INVENTION

It is an important object of the present invention to provide an improved pneumatic fully enclosed run-flat insert structure disposed within a pneumatic tire which minimally interferes with operation of the tire when it is carrying its rated load at rated inflation pressure and which, when the tire is deflated, will maintain the tire seated on its wheel rim and support the rated load of the tire at a deflection of the tire and insert structure which permits optimum speed and mileage without substantial deterioration of the tire while running in such a deflated, run-flat condition.

It is a further object of this invention to provide a pneumatic fully enclosed run-flat insert support structure comprised of a homogeneous material and capable of withstanding the various impacts and stressing incurred by such a structure when the tire within which it is disposed is in a deflated condition and the insert structure and tire together rotate through the tread patch of the tire.

It is another object of the invention to provide a pneumatic fully enclosed run-flat insert support structure which effectively retains the beads of the tire within which it is disposed seated on a wheel rim and does not interfere with the functioning of the sidewall of the tire during rated load and inflated operation of the tire.

In general, the objects of the invention are accomplished by the provision of a fully enclosed pneumatic run-flat insert structure mounted within the cavity formed by a pneumatic tire and a wheel rim upon which the tire is mounted. The insert structure is spaced a distance from the interior crown region of the tire such that contact between said region and the insert structure is minimized during rated load carrying and inflation conditions of the tire. The volume of the insert structure is preferably less than 50% of the volume of the cavity formed by the tire and the wheel rim. When the tire is in a deflated condition, the insert structure will support the rated load of the tire such that the deflection of the tire will not exceed approximately 31% of its section height. When the structure is carrying such load, it will have a deflection of preferably between 6% and 19% of the section height of the tire. The radially inward sidewall region of the insert structure bears against the interior bead region of the tire and the amount of surface area of the tire bead region in engagement with the insert structure does not vary with changes in the deflection of the tire and insert structure. The insert structure at no time interferes with the flexing function of the sidewall of the tire.

BRIEF DESCRIPTION OF THE DRAWINGS

The foregoing and other objects and features of the present invention will be more clearly understood from the following detailed description thereof when read in conjunction with the accompanying drawings, in which:

FIG. 2 is a cross-sectional elevation view of the tire and insert structure of FIG. 1 with the tire in a deflated condition and the insert structure supporting the load normally supported by the tire when the latter is inflated.

DESCRIPTION OF THE PREFERRED EMBODIMENT

Figure 1:
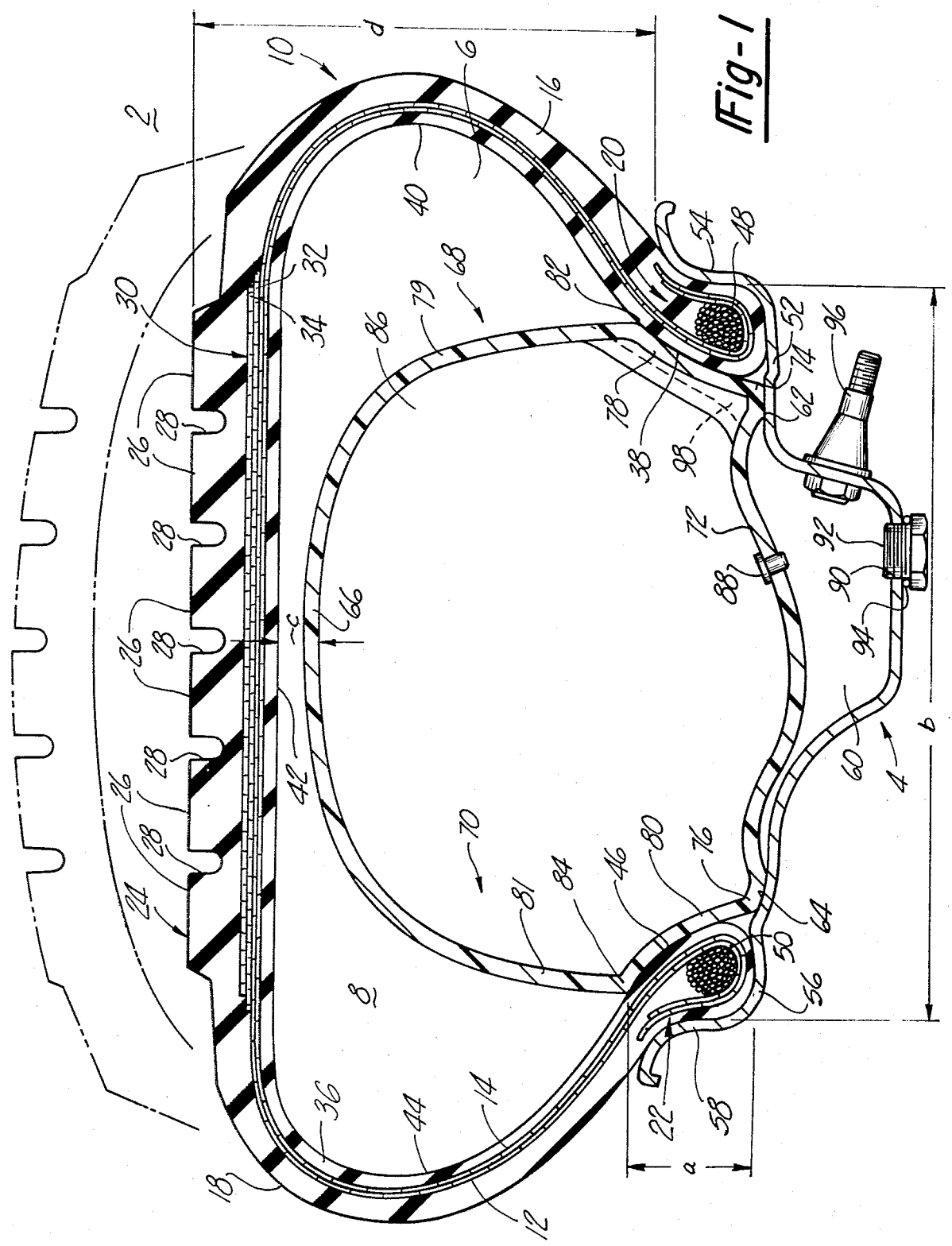
FIG. 1 is a cross-sectional elevation view of a pneumatic tire supporting its rated load and inflated to its rated inflation pressure and a run-flat insert structure positioned within the air cavity of the tire in accordance with the present invention.

Referring generally to the drawings, there is illustrated a pneumatic tire 2 mounted on a wheel rim 4. The tire 2 and rim 4 together form a cavity or air chamber 6 within which a generally annular, fully enclosed pneumatic run-flat insert structure 8 is supported. In FIG. 1, the tire 2 is shown in a loaded condition in full lines and in an unloaded condition in phantom lines. The tire 2 includes a carcass 10 having one or more superposed carcass plies, such as plies 12 and 14, and sidewalls 16 and 18 overlying opposed sidewall regions of the carcass and terminating at their radially inward edges in a pair of bead regions 20 and 22. A tread 24 overlies the crown region of the carcass 10 and is connected at its lateral edges to sidewalls 16 and 18. The tread 24 includes a plurality of tread ribs 26 and a plurality of grooves 28. A belt 30 having belt plies 32 and 34 for providing reinforcing support to the tread 24 and lateral stability to the tire is disposed between the crown region of the carcass 10 and the tread 24. A fluid-impervious liner 36 forms the interior surface of the carcass 10 and extends along the interior side 38 of bead region 20, the interior side 40 of sidewall 16, the interior crown region 42 of the carcass radially inward of the tread, the interior side 44 of sidewall 18 and the interior side 46 of bead region 22. In addition to the sides 38 and 46, the bead regions 20 and 22 respectively include bead wires 48 and 50. The bead region 20 is seated on the bead seat 52 of rim 4 and tightly engages the flange 54 of rim 4. The bead region 22 is seated on bead seat 56 of rim 4 and tightly engages flange 58 of rim 4.

The rim 4 includes, in addition to the bead seats and flanges mentioned above, a well 60 for assisting in mounting the tire 2 on the rim 4 and seating surfaces 62 and 64 respectively adjacent the bead seats 52 and 56. The seating surfaces 62 and 64 are annular shaped and assist in supporting the run-flat insert structure 8.

The run-flat insert structure 8, as shown in FIGS. 1 and 2, has a radially outward crown wall 66 positioned immediately radially inward of the crown region 42 of the tire 2, first and second lateral walls 68 and 70, and a radially inward wall 72 positioned adjacent to the well 60 and bead seat 52 and 56 of rim 4. The inward wall 72 includes annular wall portions 74 and 76 respectively seated on the seating surfaces 62 and 64 of the rim 4 and providing part of the support for the run-flat insert structure 8.

The lateral walls 68 and 70 of the run-flat insert structure 8 respectively include radially inward annular wall portions 78 and 80 and radially outward annular wall portions 79 and 81. The wall portions 78 and 80 respectively bear against the interior sides 38 and 46 of bead regions 20 and 22. The wall portions 78 and 79 connect along a circumferential edge which appears as corner 82 in the drawings. The wall portions 80 and 81 connect along a circumferential edge which appears as corner 84 in the drawings. As can be seen in the drawings, the angle of the walls 68 and 70 change abruptly at the circumferential edges of corners 82 and 84. Also, the radially inward wall portions 78 and 80 are concave in the direction of the interior of insert structure 8 whereas the radially outward wall portions 79 and 81 are concave in the direction of the exterior of insert structure 8. The wall portions 78 and 80 are in engagement with the sides 38 and 46 only to a height in the radial direction such that the insert structure 8 does not substantially interfere with the flexing of the sidewalls 16 and 18 or with the force and moment characteristics of the tire. Preferably, the wall portions 78 and 80 extend a distance a, as shown in FIG. 1, radially outward of the most radially inward part of the bead regions 20 and 22 such that the contact of the wall portion 78 or 80 with the corresponding bead region 20 or 22 does not extend in a laterally outward direction beyond the rim width of the rim 4 when the tire 2 is inflated to its rated inflation pressure and is supporting its rated load. The term "rim width" is the distance between the two flanges of a rim as designated in the drawing entitled "New Tire Dimensions" on page IX of the 1977 Year Book of The Tire and Rim Association, Inc. The rim width of the rim 4 is identified by the letter b as shown in FIG. 1.

The walls 66, 68, 70 and 72 form a closed, air tight chamber 86 within the insert structure 8. The air chamber 86 preferably has a volume that is less than one-half of the volume of the chamber 6 formed by the tire 2 and wheel rim 4. Depending on the tire size and the size of the insert structure used in the tire, the chamber 86 may have a volume of between 33% and 48% of the volume of the chamber 6. The radially inward wall 72 of the insert structure 8 is provided with a built-in valve 88 for inflation with a needle inflator. Access to the valve 88 is obtained through an opening 90 in the wall 60 of rim 4 which is normally enclosed by a threaded plug 92 and gasket 94. The insert structure 8 is not held fixed by an inflating valve connection and is free to move relative to the rim 4 and tire 2. The air chamber of the tire 2 is inflated through an ordinary valve 96 and an air passage 98 integral with the insert structure 8 and connecting the interior of the well 60 with the air chamber 6.

The insert structure 8 must be able to operate during the normal inflated condition of the tire 2 when the insert may be subject to occasional bumping and flexing by the tire and also during the deflated condition of the tire 2 when the insert carries the load and is subject to considerable stressing and high temperature operation. Accordingly, the insert structure 8 is made from a homogeneous material and preferably is of an elastomer that has good low temperature flexibility, high impact resistance at high temperature and low aging properties at high temperature. The following specific physical characteristics are desirable:

| Tear Strength | 600–1200 | lb./in. |
|---|---|---|
| Tensile Strength | 6000–6500 | lb./in$^2$. |
| Abrasion Resistance | 60–200 | mg./1000 cycles |
| Flexural Modulus | 7000–70,000 | lb./in$^2$. |
| Hardness | 40–90 | Shore A |

Thermosettable elastomers of the urethane polymer type, such as a polyether or polyester polymer, are preferred, particularly because of their high values of flexural modulus and tensile strength at operating temperatures in the range of −40° C. to 235° C. Thermoplastic elastomers which may also be suitable are the copolyetheresters such as are marketed under the trade name Hytrel by the E. I. du Pont de Nemours Company.

In FIG. 1, the tire 2 is shown inflated to its rated inflation pressure and supporting its rated load. The insert structure 8 is not supporting any load and it is inflated to at least the rated inflation pressure of the tire 2 and preferably is inflated to a greater pressure than that of the tire 2, preferably in the range of 25% to 100% greater than the rated inflation pressure of the tire. In this condition of the tire 2 and the insert structure 8, the distance c in a radial direction between the interior crown region 42 of the tire 2 and the crown wall 66 of insert structure 8 in the region of contact of the tread with a road surface is in the range of 1.0% to 7.0% and preferably in the range of 2.0% to 5.0% of the section height d of the tire 2 when it is in a static non-rolling condition. The actual values of the typical clearance distances within these ranges are 0.04 to 0.3 inches, depending on the tire and insert size. Distances within such ranges are sufficient to minimize engagement and scuffing of the crown wall 66 of the insert structure 8 and the interior crown region 42 of the tire 2 during inflated load carrying and rolling conditions of the tire 2, while at the same time limiting the deflection of the tire 2 and the insert structure 8 when the tire 2 is deflated to desired values which will be discussed hereinafter.

With regard to FIG. 2, the tire 2 is shown in a relatively deflated condition in which it is no longer inflated to its rated inflation pressure and it is supported by the run-flat insert structure 8 which is carrying all or a substantial portion of the load normally supported by the tire 2. In this condition of the tire 2 and insert structure 8, the interior crown region 42 of the tire 2 and the crown wall 66 of the insert structure 8 are in substantially continuous engagement in the vicinity of the tire tread patch. As a result of the position of the crown wall 66 of the insert structure 8 adjacent to the interior crown region 42 of the tire 2 when the tire 2 is inflated as shown in FIG. 1 and the shape and size of the insert structure 8 such that it does not deform laterally into contact with the sidewall 16 and 18 of the tire 2, the deflection of the tire 2 and the insert 8 is held to a minimum. Thus, when the tire 2 is in a relatively deflated condition and the run-flat structure 8 is carrying all or a substantial part of the load normally carried by the tire 2, the deflection of the tire 2 will be in the range of 12% to not more than 31% of the section height d of the tire 2. The deflection of the insert structure 8 will be in the range of between 6% and 19% of the section height d of the tire. Note that the deflections of the tire 2 and insert structure 8 as shown in FIG. 2 are relative to the condition of the insert structure 8 and the full line tire 2 as shown in FIG. 1.

As previously mentioned, the material of the insert structure 8 may be either a thermoplastic or thermosettable elastomer. However, a thermosettable elastomer will provide greater durability due to its longer fatigue life which is of critical importance in enabling the insert structure 8 to carry load for a maximum distance and at maximum possible vehicle speed. Moreover, when the insert structure 8 is carrying load it will tend to be scuffed and moved in a circumferential direction by its contact with the tire 2 as the tire rotates through its tread patch with the road surface. The freedom of the insert structure 8 to move relative to the tire 2 and the rim 4 thus enhances its durability since any immovable connection with the tire 2 or rim 4, such as a valve connection, tends to stress the wall of the insert structure 8 at the point of connection and result in its premature rupture. In order to further improve the durability of the insert structure 8 when it is carrying load, the friction caused by rubbing and scuffing of the insert 8 by the tire 2 can be minimized by providing a lubricant between the engaging crown wall regions of the tire and insert. Any of several known modes and methods may be used to do this and a detailed discussion need not be provided herein.

It will be understood that the foregoing description of the preferred embodiment of the present invention is for purposes of illustration only, and that the various structural and operational features as herein disclosed are susceptible to a number of modifications and changes, none of which entail any departure from the spirit and scope of the present invention as defined in the hereto appended claims.

What is claimed is:

1. In combination with a pneumatic tire and a wheel rim upon which the tire is supported, said wheel rim having an annular support surface extending laterally in the direction of the axis of the wheel rim and a pair of axially spaced apart annular flanges each connected to and extending radially outward from said annular support surface, the distance between said radially extending annular flanges being the rim width of the wheel rim, said tire having a pair of axially spaced annular beads each in engagement with one of said flanges and the support surface, a pair of sidewalls each connected to and extending generally radially outward from the beads, and a tread connected to the radially outward ends of the sidewalls, said tire and wheel rim forming a closed toroidal cavity:

a generally toroidal shaped, hollow, inflatable insert disposed within said cavity and bearing against said support surface of the wheel rim and having a pair of lateral walls each in engagement with one of the bead regions of the tire, said insert having an interior volume of less than 50% of the volume of said cavity; and each lateral wall has a radially inward annular wall portion which, in cross section, is concave in the direction of the interior of the insert and a radially outward annular wall portion which, in cross section, is concave in the direction of the exterior of the insert, said radially inward and radially outward annular wall portions being joined together along a circumferential edge between their respective opposed concavities, said circumferential edge projecting a corner in the cross section of said lateral wall, said corner of each lateral wall being located at a distance radially outward of the most radially inward part of the bead region such that the contact of said radially inward annular wall portion with the tire does not extend in a laterally outward direction beyond the rim width, and the radially inward annular wall portions are the only wall portions of the lateral walls in engagement with the tire.

2. The combination according to claim 1 wherein the interior volume of said insert is between 33% and 48% of the volume of said cavity.

* * * * *